United States Patent
Park et al.

(10) Patent No.: US 9,027,041 B2
(45) Date of Patent: *May 5, 2015

(54) TURN TABLE FOR SPINDLE MOTOR

(71) Applicant: LG Innotek Co., Ltd., Seoul (KR)

(72) Inventors: Jae Hyun Park, Ansan-si (KR); Cheong Un Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,906

(22) Filed: Oct. 8, 2013

(65) Prior Publication Data

US 2014/0040925 A1    Feb. 6, 2014

Related U.S. Application Data

(63) Continuation of application No. 12/562,392, filed on Sep. 18, 2009, now Pat. No. 8,584,154.

(30) Foreign Application Priority Data

Sep. 29, 2008 (KR) .......................... 10-2008-0095422

(51) Int. Cl.
*G11B 17/028* (2006.01)

(52) U.S. Cl.
CPC .................................. *G11B 17/0282* (2013.01)

(58) Field of Classification Search
USPC .................................................. 720/695–717
See application file for complete search history.

(56) References Cited

U.S. PATENT DOCUMENTS

| | | | |
|---|---|---|---|
| 4,570,256 A | 2/1986 | Tamaru | |
| 4,791,624 A | 12/1988 | Stinesen | |
| 5,501,760 A | 3/1996 | Mukawa | |
| 2003/0076774 A1 | 4/2003 | Tokumitsu | |
| 2005/0022223 A1 | 1/2005 | Hsu et al. | |
| 2005/0102693 A1 | 5/2005 | Schuller et al. | |
| 2006/0031867 A1 | 2/2006 | Ikemoto | |
| 2007/0294712 A1* | 12/2007 | Ito et al. | 720/702 |
| 2007/0294713 A1 | 12/2007 | Yoon | |
| 2008/0059984 A1 | 3/2008 | Kanzawa et al. | |

FOREIGN PATENT DOCUMENTS

| | | |
|---|---|---|
| CN | 1436349 A | 8/2003 |
| JP | 2008-117474 A | 5/2008 |
| WO | WO-2005/093739 A1 | 10/2005 |

OTHER PUBLICATIONS

Office Action dated Jun. 6, 2013 in Chinese Application No. 200910177313.3, filed Sep. 29, 2009.
Office Action dated Aug. 31, 2010 in Korean Application No. 10-2008-0095422, filed Sep. 29, 2008.

* cited by examiner

*Primary Examiner* — Nathan Danielsen
(74) *Attorney, Agent, or Firm* — Saliwanchik, Lloyd & Eisenschenk

(57) ABSTRACT

A turn table of a spindle motor is provided, wherein an outer diameter of a vertical portion at the disk insertion unit facing an inner periphery of a small-diameter disk is smaller by 0.01% to 0.15% than the inner periphery of the small-diameter disk to enable a chucking of the small-diameter disk having an inner diameter of an inner periphery smaller than 15 mm.

10 Claims, 3 Drawing Sheets

TURN TABLE FOR SPINDLE MOTOR

CROSS-REFERENCE TO RELATED APPLICATIONS

This application is a continuation of U.S. application Ser. No. 12/562,392, filed Sep. 18, 2009, which claims the benefit under 35 U.S.C. §119 of Korean Patent Application No. 10-2008-0095422, filed Sep. 29, 2008, which are hereby incorporated by reference in their entirety.

BACKGROUND

The present disclosure relates to a turn table of a spindle motor. A DVD (digital video disk) is widely used due to advantage of information recording capacity 6~8 times larger than that of a CD (compact disk). The DVD has a very narrow gap between tracks in which information is recorded as DVD has a large capacity. Due to the fact that the gap is narrow between the tracks, a resiliently supporting claw is applied to accord a center of the DVD on which a turn table is mounted with that of a rotation shaft.

BRIEF SUMMARY

Exemplary aspects of the present disclosure are to substantially solve at least the above problems and/or disadvantages and to provide at least the advantages as mentioned below. Thus, the present disclosure intends to provide a turn table of a spindle motor having an advantageous capacity of free attachment and detachment of a small-diameter disk.

In one general aspect of the present disclosure, there may be provided a turn table of spindle motor, the turn table may comprises a disk insertion unit into which an inner periphery of a disk is inserted; and a claw resiliently configured to press the inserted disk by being protruded at the disk insertion unit, wherein an outer diameter of a vertical portion at the disk insertion unit facing an inner periphery of a small-diameter disk may be smaller by 0.01% to 0.15% than the inner periphery of the small-diameter disk to enable a chucking of the small-diameter disk having an inner diameter of an inner periphery smaller than 15 mm.

In some exemplary of the present invention, an outer diameter of the vertical portion at the disk insertion unit may range from 14.94 mm to 14.96 mm.

In some exemplary of the present invention, a height of the vertical portion at a disk insertion unit may range from 8% to 50% of thickness of a disk.

In some exemplary of the present invention, the height of the vertical portion may range from 0.1 mm to 0.6 mm.

In some exemplary of the present invention, an outer diameter of the claw may range from 15.17 mm to 15.23 mm.

In some exemplary of the present invention, a claw insertion force may be less than 80% of a clamping force.

In some exemplary of the present invention, the height of the vertical claw portion at the claw may range from 15% to 42% of a thickness of a disk.

In some exemplary of the present invention, the height of the vertical claw portion at the claw may range from 0.2 mm to 0.5 mm.

In another general aspect of the present disclosure, there may be provided a turn table for spindle motor, the turn table may comprise an axial coupling unit to which a rotation shaft is coupled; a disk insertion unit into which a disk is inserted; an accommodation unit in which the inserted disk is accommodated; and a claw formed at the disk insertion unit for resiliently supporting the inserted disk apart from the disk insertion unit, wherein the disk insertion unit may comprises an inclination portion guiding the inserted disk, and a vertical portion extensively formed from the inclination portion to the disk accommodation unit to allow an inner periphery of the disk to be brought into contact, wherein the claw may comprise an inclination claw portion guiding the inserted disk, and a vertical claw portion bent from the inclination claw portion to chuck the disk, and wherein an outer diameter of the vertical portion at the disk insertion unit may range from 14.94 mm to 14.96 mm and an outer diameter of the vertical claw portion at the claw may range from 15.17 mm to 15.23 mm.

In some exemplary of the present invention, a height from the disk accommodation unit to a boundary between the inclination portion and the vertical portion of the disk insertion unit may range from 0.1 mm to 0.6 mm, and a height from the disk accommodation unit to a boundary between the inclination claw portion and the vertical claw portion of the claw may range from 0.2 mm to 0.5 mm.

In some exemplary of the present invention, a claw insertion force may be less than 80% of a clamping force.

DETAILED DESCRIPTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 1:
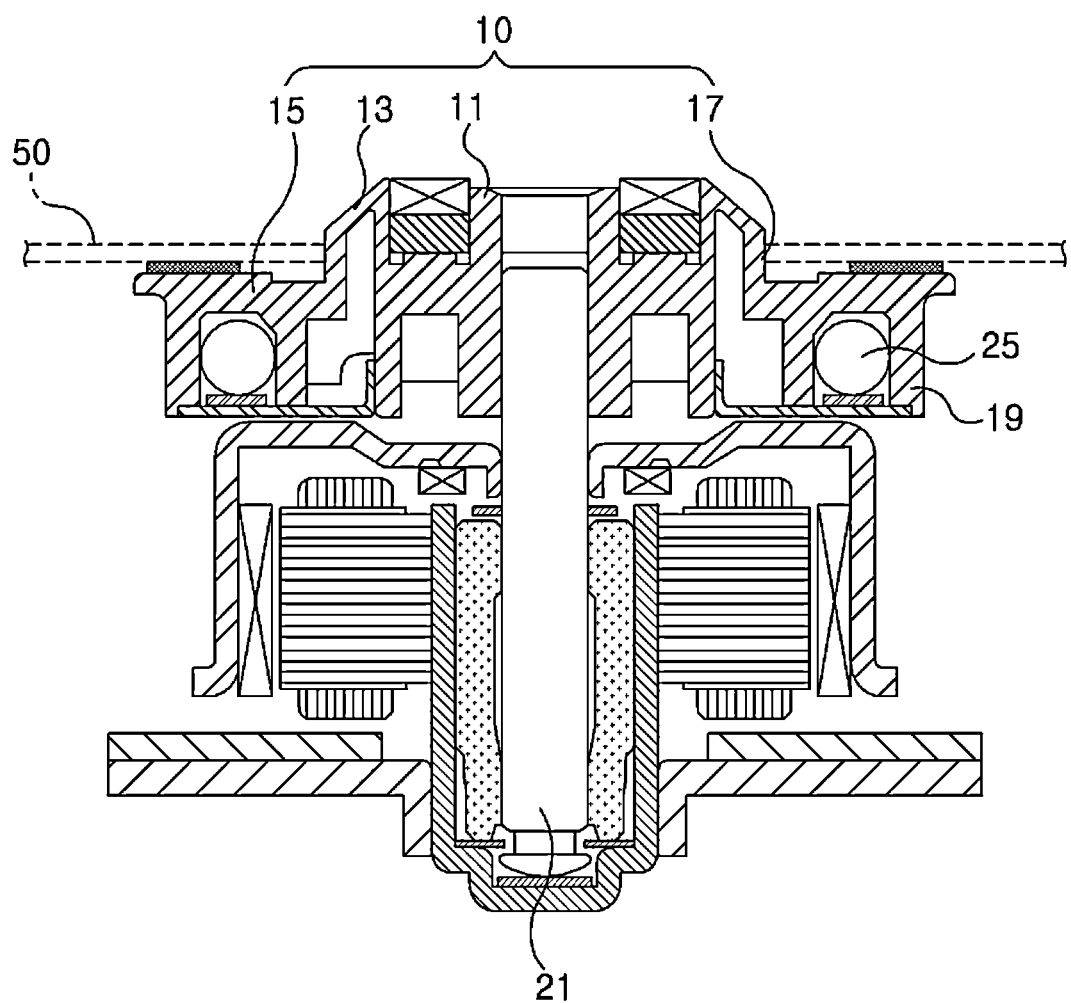
FIG. 1 is a cross-sectional view illustrating a spindle motor according to an imaginary exemplary embodiment for comparison with the present disclosure.
Figure 1A:
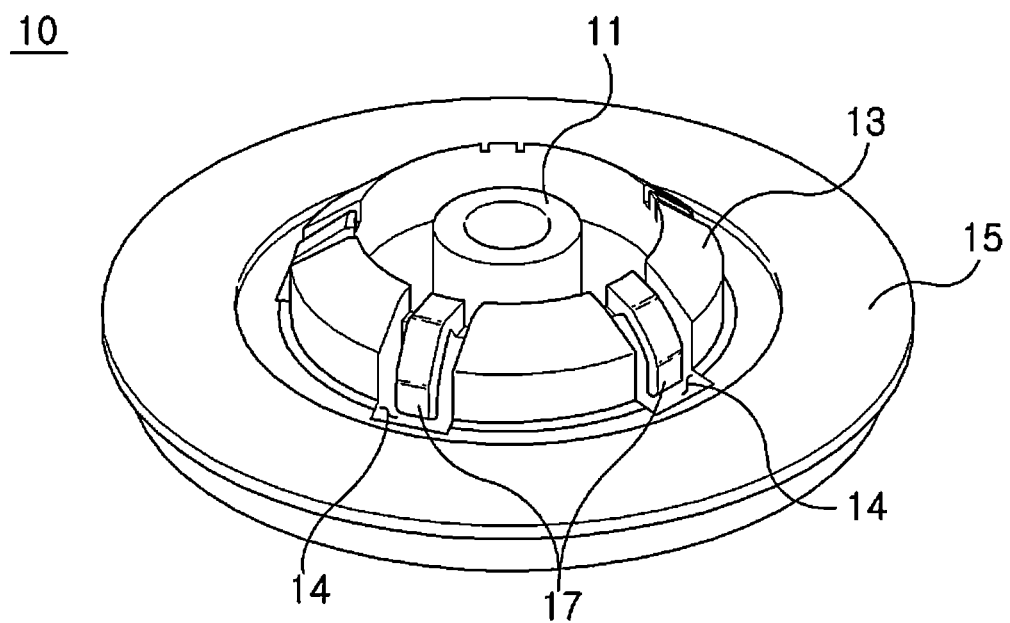
FIG. 1a is a perspective view illustrating a turn table of FIG. 1.

FIG. 1 is a cross-sectional view illustrating a spindle motor according to an imaginary exemplary embodiment for comparison with the present disclosure, and FIG. 1a is a perspective view illustrating a turn table of FIG. 1.

As illustrated in FIGS. 1 and 1a, a turn table 10 supportively mounted by a disk 50 is formed of a single body, and includes an axial coupling unit 11, a disk insertion unit 13, a disk accommodation unit 15, and a claw 17.

The axial coupling unit 11 having a substantially pipe-shaped body is coupled at an inner periphery by a rotation shaft 21 press-fitted thereinto. The disk insertion unit 13 having a substantially ring-shaped body is separated from an outer periphery of the axial coupling unit 11 at a predetermined distance, and is inclined at an outer lateral unit into which a disk 50 is inserted. The disk accommodation unit 15 is extensively formed from the outer periphery of the disk insertion unit 13 and is mounted with the disk 50.

A plurality of opening units 14 is formed along the disk insertion unit 13 and is formed with a claw 17. The claw 17 is independently operated from the disk insertion unit 13 and resiliently supports the disk 50 so that a center of the disk 50 inserted into the disk insertion unit 13 can corresponds with that of the rotation shaft 21.

An inner diameter of a disk is conventionally 15.00 mm~15.15 mm, and in case of a DVD having two disks vertically stacked, a so called small-diameter disk may be manufactured having an actual inner diameter of 14.96 mm due to disaccord of the centers of two disks during stacking. If the center-disaccorded disks are mounted on the conventional turn table, there is a high likelihood of causing a defect known as a disk chucking. Exemplary embodiments of the present disclosure will now be described for solving the aforementioned drawbacks.

Figure 2:
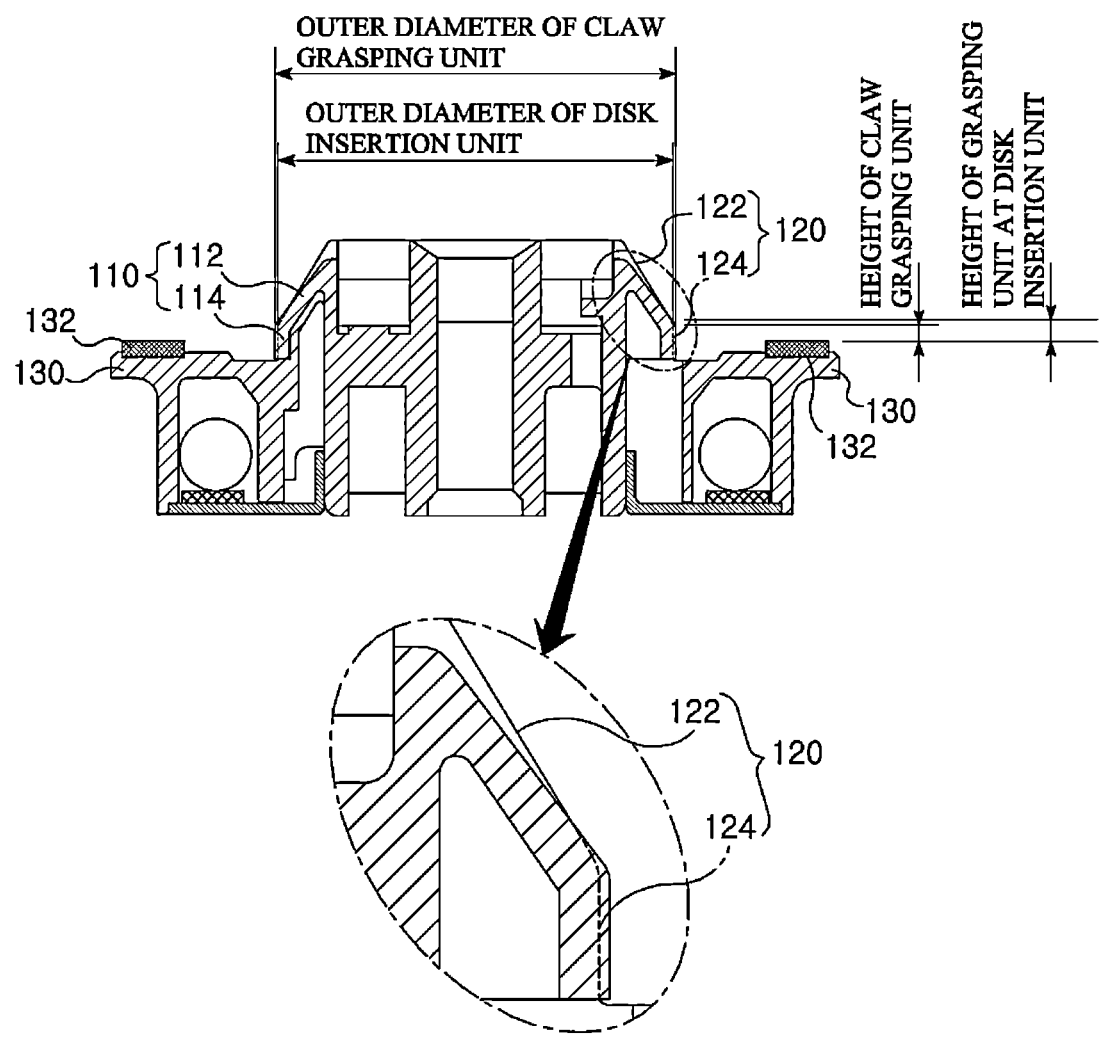
FIG. 2 is a schematic view defining dimensions of a turn table according to the present disclosure.

FIG. 2 is a schematic view defining dimensions of a turn table according to the present disclosure.

Referring to FIG. 2, the present disclosure serves to limit an outer diameter of a vertical portion 124 at a disk insertion unit 120 and that of a vertical claw portion 114 of a claw 110 to allow free attachment and detachment of a disk, and preferably, heights of the disk insertion unit 120 and claw 110 are restrained to enable a stable obtainment of recording and reading.

More preferably, deterioration of centering performance caused by narrowing an outer diameter of the vertical portion 124 at the disk insertion unit 120 and that of the vertical claw portion 114 at the claw 110 may be improved by restraining the insertion of the claw 110.

Referring again to FIG. 2, the disk insertion unit 120 includes an inclination portion 122 and a vertical portion 124 vertically and extensively formed from the inclination portion 122 to a disk accommodation unit 130 and contacted by inner periphery of the disk, where the inclination portion 122 functions to guide the disk to be inserted, and the vertical portion 124 functions to chuck the disk along with the claw 110.

An outer diameter of the vertical portion 124 at the disk insertion is limited to 14.94 mm to 14.96 mm, which is a limited dimension to allow being smaller than an inner diameter of a small-diameter disk by approximately 0.01%~15%.

If the outer diameter of the vertical portion 124 is greater than 14.96 mm, the chucking of the small-diameter disk is not smoothened, and if the outer diameter of the vertical portion 124 is smaller than 14.96 mm, the disk cannot be stably supported during chucking of the disk, such that recording and reading errors of disk may occur due to trembling of disk caused by centrifugal force when the disk is rotated at a high speed.

A height of the vertical portion 124 is a height from a disk accommodation unit 130 to a boundary between the inclination portion 122 and the vertical portion 124 of the disk insertion unit 120. However, the height of the vertical portion 124 is actually a height up to the boundary from a pad 132 because the disk accommodation unit 130 is installed with the pad 132 on which the disk is accommodated.

According to the present disclosure, the height of the vertical portion 124 is 0.1 mm~0.6 mm, which is approximately 8%~50% of a 1.2 mm thickness disk.

If the height of the vertical portion 124 is greater than 0.6 mm, the chucking of small-diameter disk cannot be smoothened, and if smaller than 0.1 mm, the disk cannot be stably supported during chucking of the disk, such that recording and reading errors of disk may occur due to trembling of disk caused by centrifugal force when the disk is rotated at a high speed.

Referring to FIG. 2, the claw 110 includes an inclination claw portion 112 and a vertical claw portion 114, where the inclination claw portion 112 serves to guide the disk that is inserted and the vertical claw portion 114 serves to chuck the disk.

Now, an exemplary embodiment of an outer diameter of the vertical claw portion 114 at the claw 110 will be explained.

The outer diameter of the vertical claw portion 114 at the claw 110 is limited to 15.17 mm to 15.23 mm.

If the outer diameter of the vertical claw portion 114 at the claw 110 is greater than 15.23 mm, there is a high likelihood of the chucking of a small-diameter not being smoothened to deform or break the claw 110 due to repeated attachment and detachment. If smaller than 15.17 mm, the disk cannot be stably supported during chucking of the disk, such that recording and reading errors of disk may occur due to trembling of disk caused by centrifugal force when the disk is rotated at a high speed.

The height of the vertical claw portion 114 at the claw 110 is a height from the pad 132 of the disk accommodation unit 130 to a boundary between the inclination claw portion 112 and the vertical claw portion 114 of the claw 110, as in the case of the disk insertion unit 120.

According to the present disclosure, the height of the vertical claw portion 114 at the claw 110 is 0.2 mm~0.5 mm, which is approximately 15%~42% of a 1.2 mm thickness disk.

If the height of the vertical claw portion 114 is greater than 0.5 mm, the disk chucking of small-diameter disk cannot be smoothened due to repeated attachment and detachment of disks to generate a high likelihood of deforming or breaking the claw 110, and if smaller than 0.2 mm, the disk cannot be stably supported during chucking of the disk, such that recording and reading errors of disk may occur due to trembling of disk caused by centrifugal force when the disk is rotated at a high speed.

As noted above, there is a high likelihood of deteriorating the centering performance as the outer diameter of the disk insertion unit 120 is getting smaller, such that the deteriorated centering performance can be offset by limitation of claw insertion force.

The claw insertion force defines a force of a claw 110 to grasp a disk, where if the insertion force is great, the centering performance may improve but the disk chucking defects may occur if the claw insertion force becomes greater than the clamping force. Therefore, it is preferable that the claw insertion force be designed not to go over 80% of the clamping force at the maximum.

As noted above, the outer diameter and height of vertical portion 124 at the disk insertion unit 120, the outer diameter and height of vertical claw portion 114 at the claw 110 and the insertion force of claw can be selectively and properly restrained within a limited scope to smoothly chuck the small-diameter disk, and optimization of disk trembling and run-out can be restrained in the occurrence of errors on disk recording and reading.

According to the aforementioned configuration, an outer diameter and height of vertical portion at a disk insertion unit, an outer diameter and height of vertical claw portion at a claw and an insertion force of claw can be selectively and properly restrained within a limited scope to smoothly chuck a small-diameter disk, and optimization of disk trembling and run-out can be restrained in occurrence of errors on disk recording and reading.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A turn table of spindle motor, the turn table comprising:
   an axial coupling unit coupled at an inner periphery by a rotation shaft;
   a disk insertion unit into which an inner periphery of a disk is inserted, and separated from an outer periphery of the axial coupling unit; and
   a claw resiliently pressing the inserted disk by being protruded at the disk insertion unit;
   an accommodation unit extensively formed from the outer periphery of the disk insertion unit to accommodate the inserted disk; and
   a pad on the accommodation unit,
   wherein the disk insertion unit comprises a first portion inclined downwardly from an upper portion of the axial coupling unit, and a second portion integrally bent from the first portion toward the accommodation unit,
   wherein the disk insertion unit is integrally formed with the claw,
   wherein the claw comprises a first claw portion guiding the inserted disk, and a second claw portion bent from the first claw portion to chuck the disk;
   wherein an outer diameter of the second portion of the disk insertion unit is in a range of from 14.94 mm to 14.96 mm;
   wherein a height of the second portion of the disk accommodation unit, measured from the pad to a boundary between the first portion and the second portion of the disk accommodation unit, is in a range of from 0.1 mm to 0.6 mm; and
   wherein a height of the second claw portion, measured from the pad to a boundary between the first claw portion and the second claw portion is in a range of from 0.2 mm to 0.5 mm.

2. The turn table of claim 1, wherein a height of the second portion at a disk insertion unit is in a range of from 8% to 50% of thickness of a disk.

3. The turn table of claim 1, wherein a claw insertion force is less than 80% of a clamping force.

4. The turn table of claim 1, wherein a height of the second claw portion, measured from the pad to a boundary between the first claw portion and the second claw portion is in a range of from 15% to 42% of a thickness of a disk.

5. The turn table of claim 1, further comprising a plurality of opening units formed along the disk insertion unit.

6. The turn table of claim 5, wherein the claw is formed at an opening unit of the plurality of opening units.

7. The turn table of claim 1, further comprising an annular-shaped recess formed at a bottom surface of the accommodation unit, and a plurality of balls received in the annular-shaped recess.

8. A turn table for spindle motor, the turn table comprising:
   an axial coupling unit to which a rotation shaft is coupled;
   a disk insertion unit into which a disk is inserted;
   an accommodation unit extensively formed from an outer periphery of the disk insertion unit to accommodate the inserted disk;
   a pad on the accommodation unit; and
   a claw integrally formed at the disk insertion unit for resiliently supporting the inserted disk apart from the disk insertion unit,
   wherein the disk insertion unit comprises:
   a first portion inclined downwardly from an upper portion of the axial coupling unit to guide the inserted disk, and
   a second portion integrally bent from the first portion to the disk accommodation unit to allow an inner periphery of the disk to be brought into contact,
   wherein the claw comprises:
   a first claw portion guiding the inserted disk, and
   a second claw portion bent from the first claw portion to chuck the disk,
   wherein an outer diameter of the second portion of the disk insertion unit is in a range of from 14.94 mm to 14.96 mm;
   wherein a height of the second portion of the disk accommodation unit, measured from the pad to a boundary between the first portion and the second portion of the disk accommodation unit, is in a range of from 0.1 mm to 0.6 mm;
   wherein a height of the second claw portion, measured from the pad to a boundary between the first claw portion and the second claw portion is in a range of from 0.2 mm to 0.5 mm; and
   wherein an outer diameter of the claw at a boundary between the first claw portion and the second claw portion is in a range of from 15.17 mm to 15.23 mm.

9. The turn table of claim 8, wherein a claw insertion force is less than 80% of a clamping force.

10. The turn table of claim 8, further comprising an annular-shaped recess formed at a bottom surface of the accommodation unit, and a plurality of balls received in the annular-shaped recess.

* * * * *